United States Patent [19]
Porte et al.

[11] Patent Number: 5,642,615
[45] Date of Patent: Jul. 1, 1997

[54] TURBOFAN ENGINE WITH A FLOATING POD

[75] Inventors: Alain Porte, Colomiers; Danilo Ciprian, Aussonne, both of France

[73] Assignee: Aerospatiale Societe Nationale Industrielle, Paris, France

[21] Appl. No.: 618,840

[22] Filed: Mar. 20, 1996

[30] Foreign Application Priority Data

Mar. 21, 1995 [FR] France .................. 95 03276

[51] Int. Cl.⁶ ............................................. F02K 3/02
[52] U.S. Cl. .................... 60/226.1; 60/39.32; 244/54; 415/134
[58] Field of Search ............... 60/39.32, 226.1, 60/226.2, 226.3; 415/134, 145, 209.2, 209.3; 244/53 R, 54

[56] References Cited

U.S. PATENT DOCUMENTS

| | | |
|---|---|---|
| 4,361,296 | 11/1982 | Hall et al. . |
| 4,603,821 | 8/1986 | White .......................................... 244/54 |
| 5,174,525 | 12/1992 | Schilling . |
| 5,205,513 | 4/1993 | Schilling . |
| 5,452,575 | 9/1995 | Freid .......................................... 244/54 |

FOREIGN PATENT DOCUMENTS

| | | |
|---|---|---|
| 0070578 | 1/1983 | European Pat. Off. . |
| 2102187 | 4/1972 | France . |
| 2707249 | 1/1995 | France . |
| 744473 | 2/1956 | United Kingdom . |

*Primary Examiner*—Charles G. Freay
*Attorney, Agent, or Firm*—Burns, Doane, Swecker & Mathis, LLP

[57] ABSTRACT

In a turbofan engine, the mechanical connection between the pod (12) and the fan stator case (10) is limited to a centering system (22) in the immediate vicinity of the arms (20) by which the fan stator case is mounted on the central portion (16) of the engine. The aerodynamic and inertia loads applied to the pod (12), particularly on take-off and landing, consequently only lead to an acceptable deformation of the fan stator case (10). Thus, the gap between said case and the fan (18) can be kept to a very small value, which ensures maximum engine efficiency. Moreover, the centering system (22) prevents an excessive radial displacement (J') between the front of the fan stator case (10) and the adjacent portion of the pod.

17 Claims, 8 Drawing Sheets

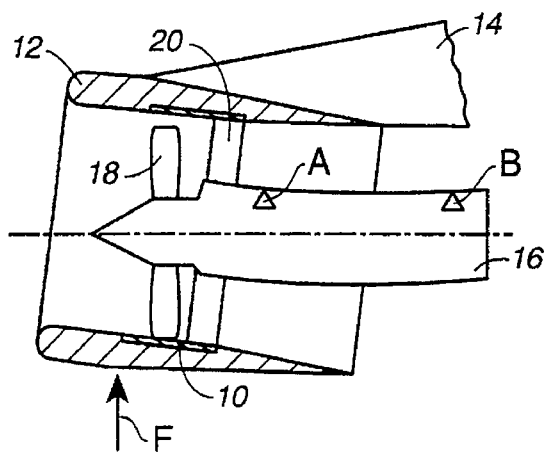
FIG._1A
(PRIOR ART)
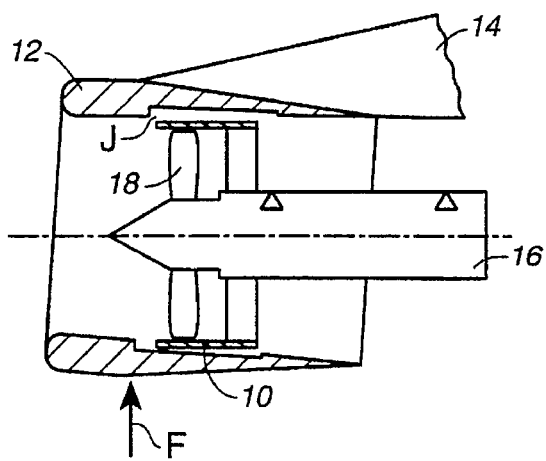
FIG._1B
(PRIOR ART)
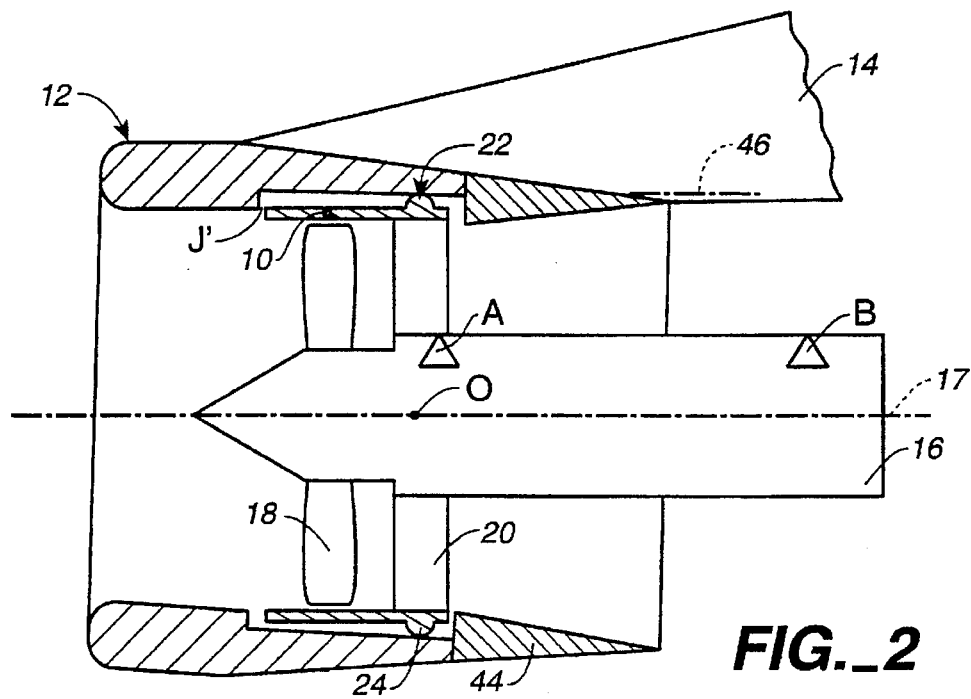
FIG._2

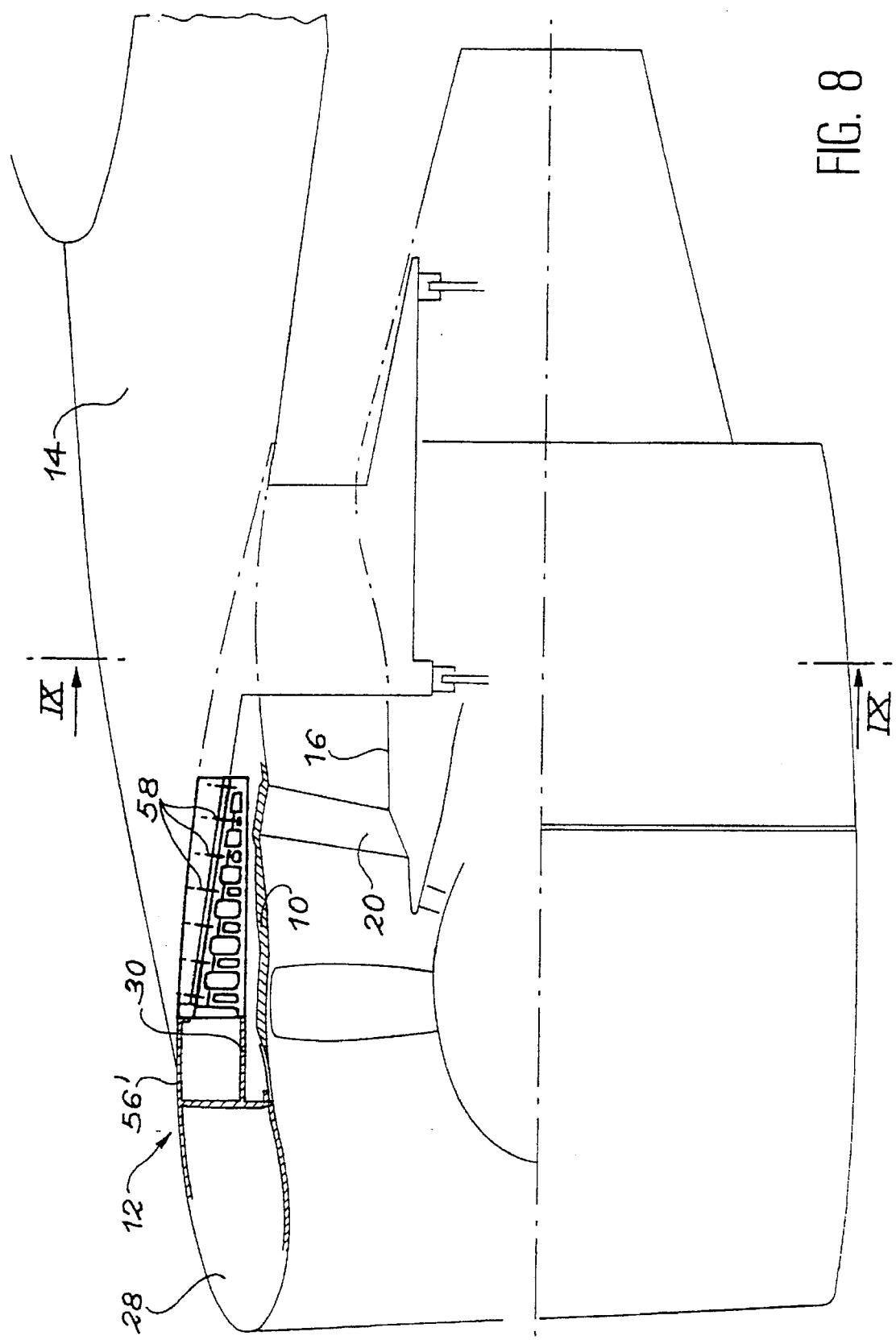

TURBOFAN ENGINE WITH A FLOATING POD

DESCRIPTION

1. Technical Field

The invention relates to a turbofan engine, in which the pod is supported in floating manner by the fan stator case in the vicinity of the arms connecting said case to the central portion of the engine.

The invention applies to all turbofan engines equipping aircraft.

2. Prior Art

In a turbofan engine, the central portion of the engine has, from the front to the back, a compressor, a combustion chamber and a high pressure turbine driving the compressor. These different components are placed in a central case, which also contains, behind the high pressure turbine, a low pressure turbine driving a fan located in front of the compressor. The fan is installed in a fan stator case connected to the central portion of the engine by one or two sets of arms oriented radially with respect to the longitudinal axis of said central portion. The fan thus creates a secondary air flow in an annular duct defined between the central case and a pod surrounding the central portion of the engine over most of its length.

Turbofan engines are suspended on an aircraft wing component by a strut or pylon, which ensures the transmission to the wing of all forces from the engine. Thus, the strut transmits to the wing both the thrust forces created by the engine and the aerodynamic and inertia loads applied to the pod by the surrounding air, particularly on take-off.

In existing turbofan engines, the structure is of the type diagrammatically shown in FIG. 1A. As is illustrated in the latter, the fan stator case 10 is rigidly fixed to the pod 12, so that said two components behave like a one-piece structure. The transfer of loads between the engine and the strut 14 is generally ensured by two systems of links or rods interposed between the non-rotary central portion 16 of the engine and the strut 14. These two systems of links, which are mutually displaced along the longitudinal axis of the central portion of the engine, are symbolically represented by triangles carrying the references A and B in FIG. 1A.

In this existing configuration, the aerodynamic and inertia loads applied to the outer surface of the pod 12 at certain critical moments of the aircraft flight, such as take-off, landing and heading changes, lead to deformations comparable to those illustrated in a deliberately exaggerated manner in FIG. 1A. These loads are applied to the outer surface of the pod 12 slightly upstream of the fan 18 and are oriented radially towards the interior of the engine, as is diagrammatically illustrated by the arrow F. Due to the fact that the transmission of forces to the strut 14 takes place entirely by the link systems A and B, the loads F are transmitted from the pod 12 to the fan jet case 10 and then from the latter to the central, non-rotary portion 16 of the engine by the radial arms 20. The rotational moment applied in this way to the pod 12 consequently leads to the deformation of the fan stator case 10, as well as the central portion 16, leading to a sag or deflection around bearing points constituted by the link systems A and B.

This deformation leads to wear to the tips of the blades of the fan section 18 and, to a lesser extent, the tips of the blades of the compressor and turbines located in the central portion 16. This wear leads to an irreversible increase in the clearances or gaps between the fixed and rotary parts of the engine, so that the efficiency of the latter is reduced. This phenomenon is particularly significant on fan blades and increases as the fan diameter increases.

It should be noted that this wear phenomenon due to deformations of the pod and the central case of turbofan engines under the effect of aerodynamic and inertia loads is taken into account during the design of said engines. This makes it necessary to use materials able to wear in damage-free manner during friction induced by the aforementioned deformations.

In order to obviate these disadvantages common to all existing turbofan engines, it has been proposed that the fan stator case 10 be separated from the pod 12, the latter being directly fixed to the strut 14, as is diagrammatically illustrated in FIG. 1B. In this configuration, the aerodynamic and inertia loads applied to the pod 12 are directly transmitted to the strut 14 without passing through the fan stator case 10 or the central portion 16. Therefore these loads give rise to no deformation of said cases. The gap between the fan blades 18 and the fan stator case 10 can consequently be maintained at very low values without any risk of wear to the blades by friction. However, this solution diagrammatically illustrated in FIG. 1B leads to disadvantages not existing in the traditional solution illustrated in FIG. 1A.

Firstly, the aerodynamic and inertia loads withstood by the pod 12 are then transmitted to the front portion of the strut 14. However, this front portion is highly tapered and its profile essentially has the function of limiting to the greatest possible extent disturbances undergone by the air flowing between the engine and the wing. The structural reinforcement of the front portion of the strut 14 imposed by this configuration may therefore lead to aerodynamic disturbances prejudicial to a good flow of air in this zone.

Moreover, the deformations undergone by the pod 12 under the effect of the aerodynamic and inertia loads symbolized by the arrow F in FIG. 1B lead to a misalignment of the air intake constituting the front of the pod 12 with respect to the remainder of the engine and in particular the fan stator case 10. At the time when the loads applied to the pod 12 are at a maximum, said misalignment can lead to the creation of a radial displacement J, which can be about 10 centimeters over a large diameter engine between the front of the fan stator case 10 and the adjacent portion of the pod 12. This radial displacement requires the presence in this area of a deformable member able to channel the air whilst withstanding the misalignments. Bearing in mind the extent of these misalignments, it appears difficult to design an effective sealing member, which leads to a limited disturbance to the flow of air and whose life would be adequate. Moreover, the extent of the misalignments, under certain flight conditions such as high air flow disturbances, are then inevitable. Thus, an engine efficiency loss is to be expected.

U.S. Pat. No. 5,205,513 and U.S. Pat. No. 5,174,525 proposes the separation of the fan stator case from the pod and the placing of a sliding coupling between these two parts, in a radial plane passing through the radial arms connecting the fan stator case to the central portion of the engine. The rear portion of the pod is connected by another series of radial arms to a support ferrule belonging to the central portion of the engine. The pod and support ferrule are subdivided into two parts along a horizontal plane and the upper part is directly attached to the strut. The lower part is normally fixed to the upper part by dismantlable fixing means permitting the removal of the central portion of the engine.

Thus, although the arrangement described in U.S. Pat. No. 5,205,513 and U.S. Pat. No. 5,174,525 makes it possible to prevent the gap between the fan and its case from being deteriorated by aerodynamic and inertia loads applied to the pod, the part of said loads not taken up by the sliding coupling still passes to the central portion of the engine before being taken up by the strut.

DESCRIPTION OF THE INVENTION

The invention therefore relates to a fan jet engine, whose original design makes it possible to prevent the gap between the fan and its case from being affected by loads applied to the pod, without there being any physical connection between the rear of the pod and the central portion of the engine, other than a swivelling connection located to the right of the arms connecting the fan stator case to said central portion.

The invention also relates to a fan jet engine, whose original design is a satisfactory compromise between the existing solution illustrated in FIG. 1A and the configuration described relative to FIG. 1B, so as to make it possible to maintain a particularly small gap between the fan and its case without the front portion of the strut having to withstand excessive loads incompatible with maintaining a satisfactory aerodynamic profile and without the radial displacement between the front of the fan stator case and the adjacent portion of the pod exceeding 3 to 4 mm, when the aerodynamic and inertia loads applied to the latter have a maximum value.

According to the invention, this result is obtained by means of a fan jet engine incorporating a rotary assembly, including a fan, and a fixed assembly, mounted on a strut for attaching the fan jet engine to a wing member, said fixed assembly including a central portion, a fan stator case surrounding the fan, at least one set of arms connecting the central portion to the fan stator case, and a pod surrounding the central portion and radially separated from the fan stator case by a gap, the pod cooperating with the fan stator case solely by centring means located in a plane in the vicinity of the arms and oriented radially with respect to a longitudinal axis of the central portion, which is characterized in that a rear portion of the pod has two covers directly articulated to the strut and incorporating a knife received in a groove formed on an intermediate portion of the pod, when the covers are closed, so that forces applied radially to the pod lead to a limited swivelling movement of said pod with respect to the fan stator case, about the intersection point of said plane with said longitudinal axis, and the forces not taken up by the centring means are transmitted directly to the strut without passing through the central portion.

By eliminating the rigid connection existing at present between the pod and the fan stator case, the invention makes it possible to avoid the aerodynamic and inertia loads withstood by the pod in certain flight phases from inducing a fan stator case deformation. The gap between the fan blades and said case can consequently be maintained at a particularly small value, without any risk of friction or wear, which ensures an increased engine efficiency compared with existing turbofan engines.

Moreover, in the absence of any other connection between the pod and the central portion of the engine, the centring means by which the pod cooperates with the fan stator case, in the vicinity of arms connecting the latter to the central portion of the engine, ensure a floating mounting of the pod on said central portion. As a result of said floating mounting, the deformations undergone by the pod under the effect of the aerodynamic and inertia loads only lead to a slight swivelling movement of the pod about one point of the longitudinal axis of the central portion located in a radial plane passing through the arms connecting the fan stator case to the central portion or in the immediate vicinity of such a plane. The maximum radial displacement induced by this swivelling movement between the front of the fan stator case and the adjacent portion of the pod consequently remains small, e.g. between 3 and 10 mm for a very large diameter engine.

In a first embodiment of the invention, the centring means incorporate at least one substantially planar, flexible member oriented radially with respect to the longitudinal axis of the central portion and connecting the pod to the fan stator case.

In this first embodiment of the invention, the flexible member can be a continuous circular ring or a segmented circular ring. It can also comprise at least two rods oriented in accordance with a first mean direction substantially orthogonal to a median plane of the strut and passing through the longitudinal axis of the central portion. The flexible member can also comprise a system of rods regularly distributed about the longitudinal axis of the central portion.

In the case where the flexible member comprises rods, each of them can have elastic means exerting a tensile stress along a longitudinal axis of said rod. Each rod can also be fixed to the pod and to the fan stator case by ball joints.

In a second embodiment of the invention, the centring means incorporate a flange formed directly on the fan stator case and fixed to the pod, e.g. by bolting.

According to a third embodiment of the invention, the centring means incorporate pads fixed to one of the parts forming the pod and fan stator case, said pads being in swivelling contact with the other part.

When the flexible member is constituted by a continuous or segmented, circular ring and when the centring means incorporate a bolted flange formed directly on the fan stator case, stabilizing means can connect the strut to the pod. These stabilizing means then make it possible to mainly transmit to the strut forces exerted on the pod in a plane perpendicular to the longitudinal axis of the central portion.

In the case where the flexible member comprises a system of rods regularly distributed around the longitudinal axis of the central portion, two links advantageously connect the strut to the pod. These links are placed in a plane orthogonal to the median plane of the strut and parallel to the longitudinal axis of the central portion and are arranged symmetrically with respect to the median plane of the strut.

At least one third link forming an angle with the aforementioned orthogonal plane can also be placed in the median plane of the strut, so as to connect the strut to the pod. To facilitate assembly, the links advantageously have a regulatable length.

In the case where the flexible member comprises at least two rods oriented in a mean direction substantially orthogonal to the median plane of the strut and in the case where the centring means incorporate pads ensuring a swivelling contact between the pod and the fan stator case, fixing means can directly connect the pod to the strut.

In a first variant, the intermediate portion of the pod has outer covers articulated to the strut and a pod case in which is formed the aforementioned groove and whereof a rear end cooperates with the fan stator case by centring means.

According to a second variant, the front portion of the pod forms a box in which is formed the said groove, and a rear end of said box cooperates with the fan stator case by centring means.

BRIEF DESCRIPTION OF THE DRAWINGS

The invention is described in greater detail hereinafter relative to non-limitative embodiments and the attached drawings, wherein show:

FIG. 1A, already described, very diagrammatically an existing turbofan engine.

FIG. 1B, already described, a view comparable to FIG. 1A illustrating another, prior art turbofan engine, FIG. 2 A sectional view comparable to FIGS. 1A and 1B very diagrammatically illustrating a turbofan engine according to the invention.

FIG. 8 A view comparable to FIG. 3 showing a second embodiment of the invention.

DETAILED DESCRIPTION OF PREFERRED EMBODIMENTS

Figure 3:
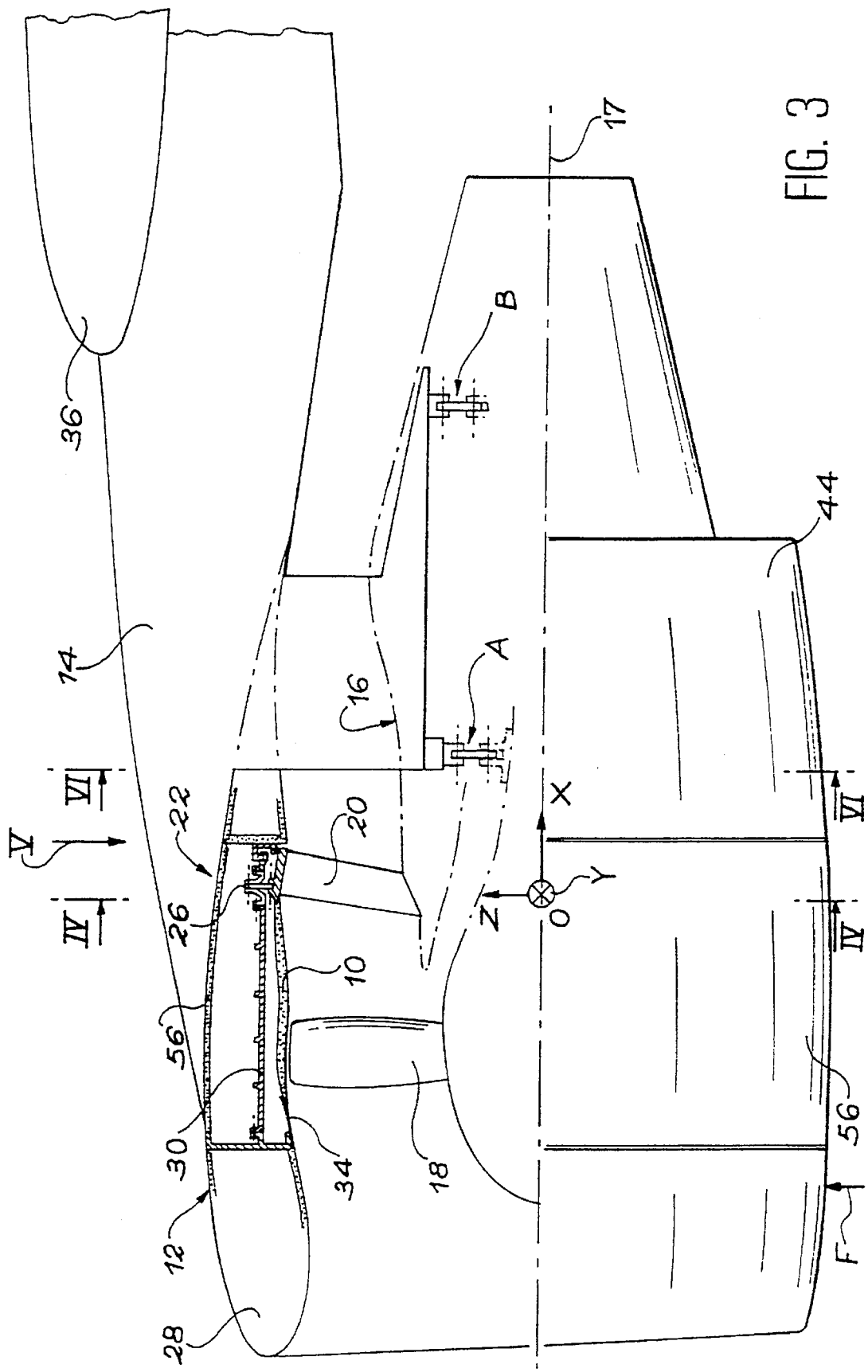
FIG. 3 A side view in part longitudinal section showing a first embodiment of a fan jet engine according to the invention.

As is very diagrammatically shown in FIG. 2, the fan jet engine according to the invention is constructed in such a way that there is no rigid connection between the fan stator case 10 and the pod 12. However, between said two structures there are centring means 22 located in a plane oriented radially with respect to the longitudinal axis 17 of the central portion 16 of the engine. This radial plane also intersects the arms 20 by which the fan stator case 10 is connected to the central portion 6 or is in the immediate vicinity of said arms.

The presence of centring means 22 between the pod 12 and the fan stator case 10 is such that there can be no radial displacement between the longitudinal axis of the case 10 and the longitudinal axis 17 of the central portion 16 in said radial plane. However, the centring means 22 allow a slight swivelling movement of the pod 12 with respect to the fan stator case 10 about a point 0 located at the intersection of the longitudinal axis 17 of the central portion 16 and the aforementioned radial plane.

By ensuring the independence of the front portion of the fan stator case with respect to the pod, said arrangement makes it possible to ensure that deformations of the latter are not transmitted to the fan stator case. Therefore there can be a minimum gap between the tips of the fan blades 18 and the case 10, which ensures a maximum engine efficiency.

It should be noted that the centring means 22 are designed in such a way that the aerodynamic and inertia loads applied radially to the pod to the front of the said radial plane, are transmitted to the central portion 16 by arms 20 mainly in the form of tensile-compressive forces.

There is also no physical connection between the rear of the pod and the central portion of the engine. Therefore the centring means 22 constitute a swivelling system between the pod and the fan stator case.

Due to the fact that the aerodynamic and inertia loads applied to the pod 12 only lead to a swivelling movement of the latter about the point 0, the radial displacement J' between the front of the fan stator case 10 and the adjacent portion of the pod 12 cannot exceed a few millimeters (e.g. 3 to 10 mm) under the most severe load conditions on a large diameter engine. The aerodynamic disturbances which are then induced in the secondary air flow flowing between the pod 12 and the central case 16 remain extremely small.

Moreover, to the extent that one of the attachment systems A and B of the central portion 16 to the pylon or strut 14 is located in the radial plane passing through point 0 or in the immediate vicinity of said plane, the aerodynamic and inertia loads withstood by the pod 12 create no deformation of the central case 16. The blade tip clearances in the compressor and in the engine turbines can consequently be kept at very small values without any risk of friction or wear under maximum aerodynamic and inertia load conditions.

In the diagrammatic representation of FIG. 2, the centring means 22 comprise semicircular pads 24 integral with the fan stator case 10 and in swivelling contact with an inner surface of the pod 12. In practice, this solution has the disadvantage of increasing the engine weight as its diameter increases. It also imposes relatively frequent and not particularly easy maintenance. This is why preference is generally given to the embodiments to be described hereinafter.

In a first embodiment illustrated in FIGS. 3 to 7, the centring means 22 according to the invention comprise a system of rods 26 located in the radial plane passing through the point 0 and regularly distributed about the longitudinal axis 17 of the central portion 16 of the engine. More specifically, the rods 26 are radially oriented so that their axes intersect at 0.

In the embodiment shown in FIGS. 3 to 7, the front portion of the pod 12 comprises a profiled box 28 forming the air intake of the engine. This box 28 is extended rearwards by a pod case 30, which surrounds over its entire length the fan stator case 10, with an adequate radial clearance to avoid said two parts coming into contact during a swivelling movement of the pod 12 around point 0, due to the application thereto of aerodynamic and inertia loads in flight. The pod case 30 is cylindrical. It has a certain flexibility in the radial direction, at least in its rear portion connected to the fan stator case 10 by rods 26. The front end of the pod case 30 is fixed by any appropriate means, e.g. bolting, to the rear of the box 28.

Figure 4:
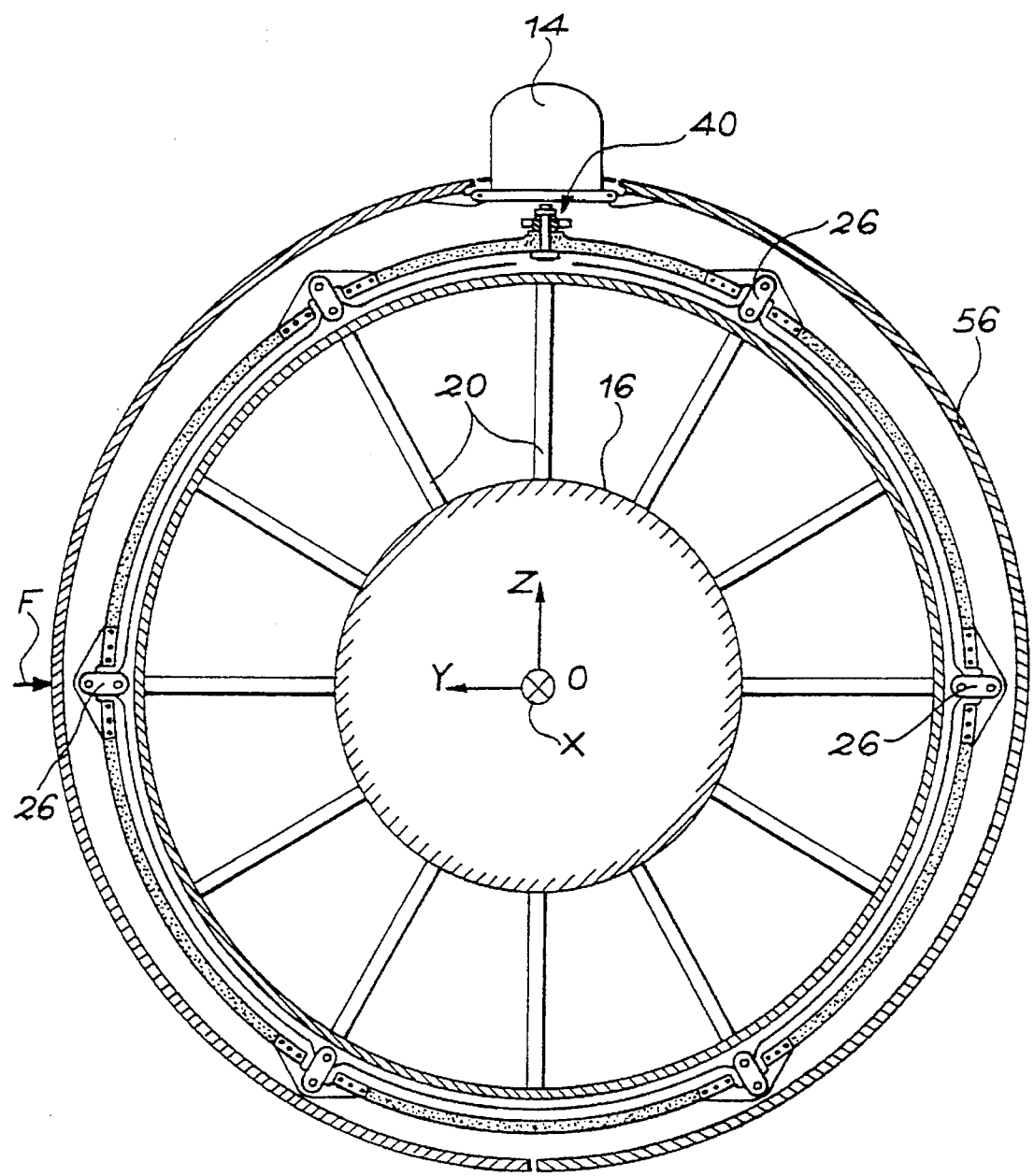
FIG. 4 A sectional view along line IV—IV of FIG. 3.
Figure 7:
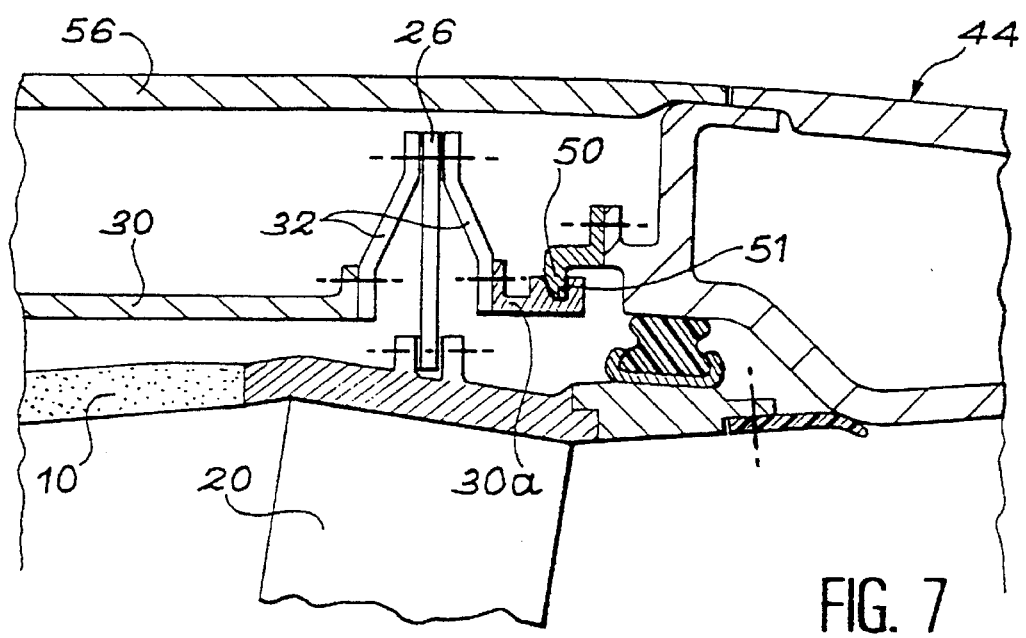
FIG. 7 A sectional view on a larger scale showing a detail of the turbofan engine illustrated in FIGS. 3 to 6.

As is more particularly illustrated in FIGS. 4 and 7, each of the rods 26 is radially oriented with respect to the longitudinal axis 17 of the central portion 16. Moreover, the radial plane containing the rods 26 intersects the arms 20 connecting the can stator case 10 to the central portion 16. As a variant, it should be noted that the radial plane containing the rods 26 could be slightly displaced parallel to the longitudinal axis 17 with respect to the arms 20 without passing outside the scope of the invention.

In the embodiment shown, each rod 26 is rigid and its ends are fixed by appropriate fixing means, such as bolts, directly to the fan stator case 10 and to the pod case 30. Bearing in mind the relatively small space existing between these two cases, the fixing of the rods 26 to the pod case 30 preferably takes place by means of anchoring supports 32 fixed, e.g. by bolting, to a flange formed at the rear end of the pod case 30. The outer ends of the rods 26 are then fixed to the anchoring supports 32 at locations displaced towards the outside with respect to the pod case, as illustrated in FIGS. 4 and 7.

In not shown, constructional variants, the fixtures of the ends of the rods 26 to each of the cases 10 and 30 can be replaced by ball joints. Moreover, each of the rods can incorporate an elastic means such as a stack of cup washers making it possible to exert a tensile stress along the axis of the rod between its attachment points.

In order to facilitate understanding, it is considered that the above-defined point 0 constitutes the origin of an orthonormal fix OXYZ, whose OX axis is carried by the longitudinal axis 17 of the central portion 16 and is oriented to the rear. The OY and OZ axes are contained in the radial plane in which are placed the rods 26 and respectively oriented in the horizontal and vertical directions.

When aerodynamic and inertia loads are applied radially to the front of the pod 12 during certain flight phases, as illustrated by the arrows F in FIGS. 3 and 4, the rods 26 are inflected in the YOZ plane to permit a swivelling movement of the pod around point 0. There is then a slight radial displacement between the front of the fan stator case 10 and the rear of the box 28 forming the air intake for the engine. However, this displacement does not exceed a few millimeters (e.g. 3 to 10 mm), so that there is only a very small disturbance to the secondary air flow flowing between the central portion 16 and the pod 12. The sealing and aerodynamic continuity between the box 28 and the fan stator case 10 can consequently be obtained with the aid of sealing means 34 with a relatively simple design, because the sealing means are no longer subject to excessive deformations.

Moreover, and as stated hereinbefore, as there is no rigid connection between the front of the fan stator case 10 and the pod 12, the swivelling movement of the pod about the point 0 produced through the application of aerodynamic and inertia loads F have no affect on the fan stator case. The gap between the blade tips of the fan section 18 and the fan stator case 10 can consequently be maintained at a very small value, no matter what the flight conditions. Therefore a maximum engine efficiency is guaranteed.

When aerodynamic and inertia loads F are applied to the pod 12, said loads are transmitted to the strut 14 by which the engine is suspended on the wing member 36 (FIG. 3) successively through the pod case 30, rods 26, arms 20 and non-rotary structures of the central portion 16. During said load transmission, it should be noted that the rods 26 mainly only have to withstand tensile and compressive stresses, which ensures their mechanical strength.

Figure 6:
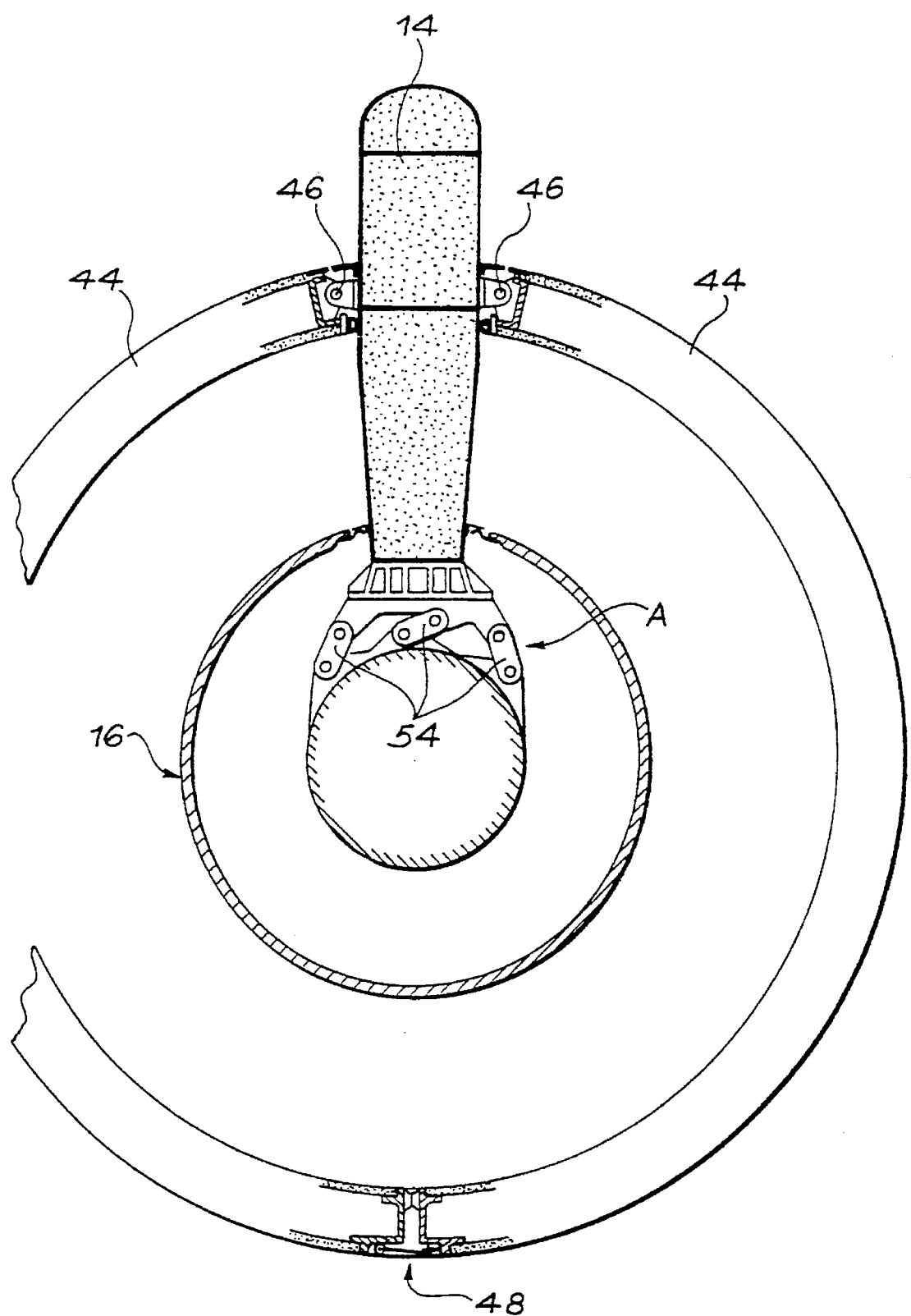
FIG. 6 A sectional view along line VI—VI in FIG. 3.

The transmission to the strut 14 of loads applied to the non-rotary parts of the central portion 16 is in this case ensured by two systems of links A and B, as in the prior art. These systems of links A and B are illustrated in simplified manner in FIG. 3 to facilitate understanding. One of the link systems A is shown in FIG. 6 and is formed by three links 54 located at a point as close as possible to the point 0 and generally to the rear of the latter.

It should be noted that, apart from the advantages mentioned hereinbefore, the invention makes it possible to maintain the tapered character of the front portion of the strut 14. Thus, the transmission of forces and rotational moments between the pod 12 and the strut 14 is such that these forces and moments are applied to the strut to the rear of its front portion.

In the embodiment illustrated in FIGS. 3 to 7, the transmission to the strut 14 of forces applied to the pod 12 along the axis OX is ensured by two links 38 (FIG. 5) directly connecting the pod case 30 to the strut 14. These links 38 are both located in a horizontal plane parallel to the plane OXY and symmetrical with respect to the vertical plane OXZ constituting the median plane of the strut 14.

More specifically, the front ends of the two links 38 are both attached to the rear of the pod case 30 by the same ball joint 40 (FIG. 4) located in the vertical plane OXZ. The rear ends of the links 38 are attached to the strut 14 by two separate ball joints 42 (FIG. 5) arranged symmetrically with respect to the vertical plane OXZ.

It should be noted that apart from their main function of transmission to the strut of the forces applied to the pod 12 along axis OX, the links 38 also participate in the transmission of forces applied to the pod 12 along axis OY, as well as rotational moments applied to the pod about the axis OX.

Figure 5:
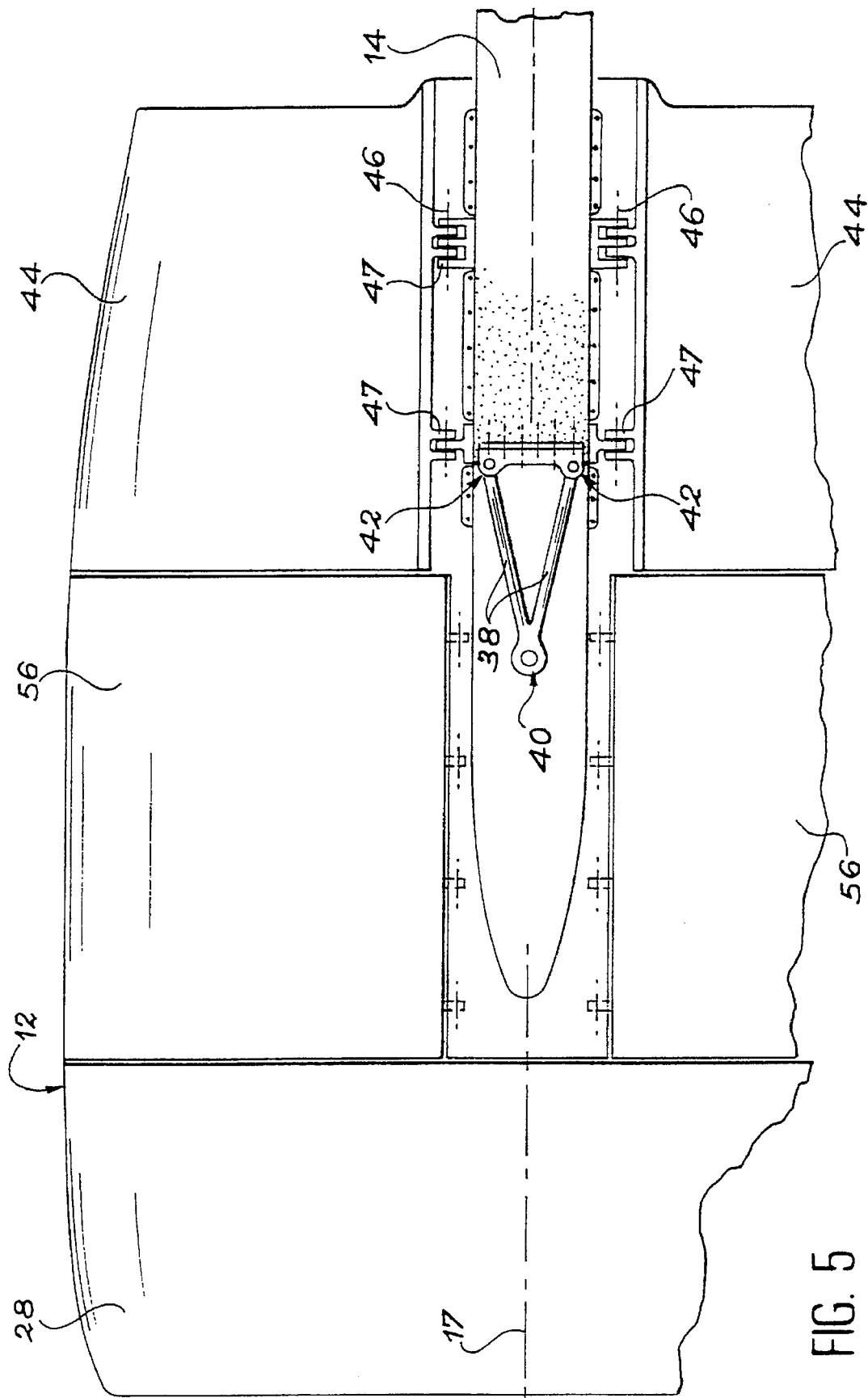
FIG. 5 A part sectional view along arrow V in FIG. 3.

Finally, the transmission to the strut 14 of rotational moments applied to the pod 12 about the axes Y and Z is ensured by two covers 44 constituting the rear portion of the pod 12, as illustrated in FIGS. 5 and 6. Each of these covers 44 has a semicircular section and is articulated on one side of the strut 14 at its upper end about an axis 46 parallel to the plane XOY. As illustrated in FIG. 5, each articulation is ensured by two groups of fittings 47 displaced along the axis OX.

When the covers 44 are closed, their lower ends are interconnected by locking means 48 (FIG. 6), which can assume any appropriate configuration.

To ensure the transmission to the strut 14 of rotational moments applied to the pod 12 about axes OY and OZ, the front end of each of the articulated covers 44 carries a knife 50 having a V-shaped cross-section, which penetrates a groove 51 having a complimentary shape formed to the rear of the pod case 30, as illustrated in FIG. 7. In the embodiment shown, the groove 51 is formed on an extension 30a of the case 30 fixed to the anchoring supports 32.

In the first embodiment of the invention, in its intermediate portion, the pod 12 also has two outer covers 56, which are also articulated to the strut 14 and ensure the aerodynamic continuity of the outer surface of the pod 12 between the box 28 and the articulated covers 44. These outer covers 56 in this case give access to equipments installed around the pod case 30.

The structure described hereinbefore with reference to FIGS. 3 to 7 constitutes a virtually isostatic mechanical system, in which the transmission of each of the forces and rotational moments between the pod 12 and the strut 14 takes place in accordance with a single path. The consequence of this isostatic character is relative movements between the pod 12 and the front of the fan stator case 10, which can at the maximum reach a few millimeters (e.g. 3 to 10 mm), as stated hereinbefore. If said movements are to be further reduced, the mechanical system is given a hyperstatic character, which increases with the increase in the desired limitation of these relative movements.

A first stage in this not shown sense consists of adding to the two links 38 directly connecting the pod case 30 to the strut 14, at least one third link by which part of the forces applied to the pod 12 along the vertical axis OZ is directly transmitted to the strut 14. This third links is then attached by its front end to the pod case 30, e.g. by a ball system 40. The rear end of the third link is attached to the strut 14 by another ball system located in the plane YOZ, but upwardly displaced with respect to the ball systems 40.

In order to facilitate the assembly of the engine, the links 38, as well as any supplementary links, are preferably length-regulatable.

In a second embodiment of the invention which will now be described relative to FIGS. 8 and 9, the hyperstatic character of the connections between the pod and the strut is further accentuated.

In this second embodiment of the invention, the outer covers 56 forming the intermediate portion of the outer envelope of the pod 12 are eliminated and replaced by a fixed outer envelope 56' forming with the pod case 30 a rearward extension of the case 28 forming the air intake of the engine.

Figure 9:
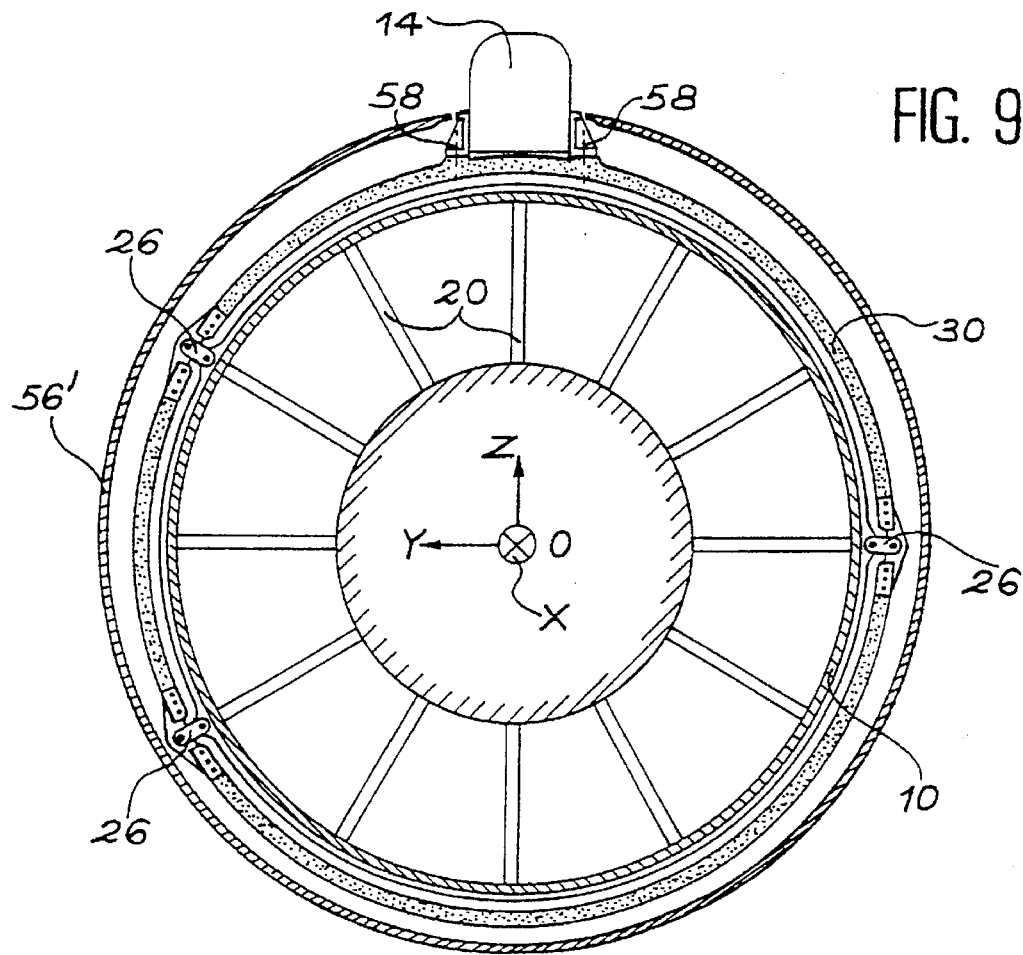
FIG. 9 A sectional view along line IX—IX of FIG. 8.

In this case, only part of the rods 26 connecting the pod case 30 to the rear of the fan stator case 10 is retained, as illustrated in FIG. 9. The rods 26, whereof there are between two and four (three in the example shown) are oriented in a mean direction substantially coinciding with the axis OY. Thus, in the embodiment shown, one of the rods 26 is oriented along the axis OY, whereas the two other rods 26 are arranged symmetrically with respect to the axis OY at a point diametrically opposite to that of the first rod 26.

The main function of the rods 26 is then to transmit to the central portion 16 of the engine the forces applied to the pod 12 in the direction Y through arms 20.

Moreover, the rods 26 are positioned and oriented in the same way as in the first embodiment, so as to work in tension and compression so as to ensure the transmission of forces and allow a swivelling movement of the pod 12 about point 0 without any deformation of the fan stator case 10.

In view of the fact that the forces exerted on the pod 12 in the vertical direction Z are only very partly transmitted to the central portion 16 through the rods 26, the rigidity of the connection provided between the pod 12 and the strut 14 is greater than in the first embodiment. Thus, this connection between the pod 12 and the strut 14 must ensure a minimum transmission to the strut 14 of forces exerted on the pod along axes OY and OZ and rotational movements about axis OX. In practice, this connection can be ensured by fixing means such as bolts 58 by which the rear extension of the box, defined between the pod case 30 and the outer envelope 56', is directly fixed on either side of the strut 14.

In the embodiment of FIGS. 8 and 9, the transmission to the strut 14 of rotational moments applied to the pod 12 about the axes OY and OZ is ensured, as in the first embodiment, by articulated covers 44. More specifically, said transmission is ensured by the cooperation of knives 50 carried by the covers 44 with a groove 51 having a V-shaped section formed on the rear extension of the case 28.

Figure 10:
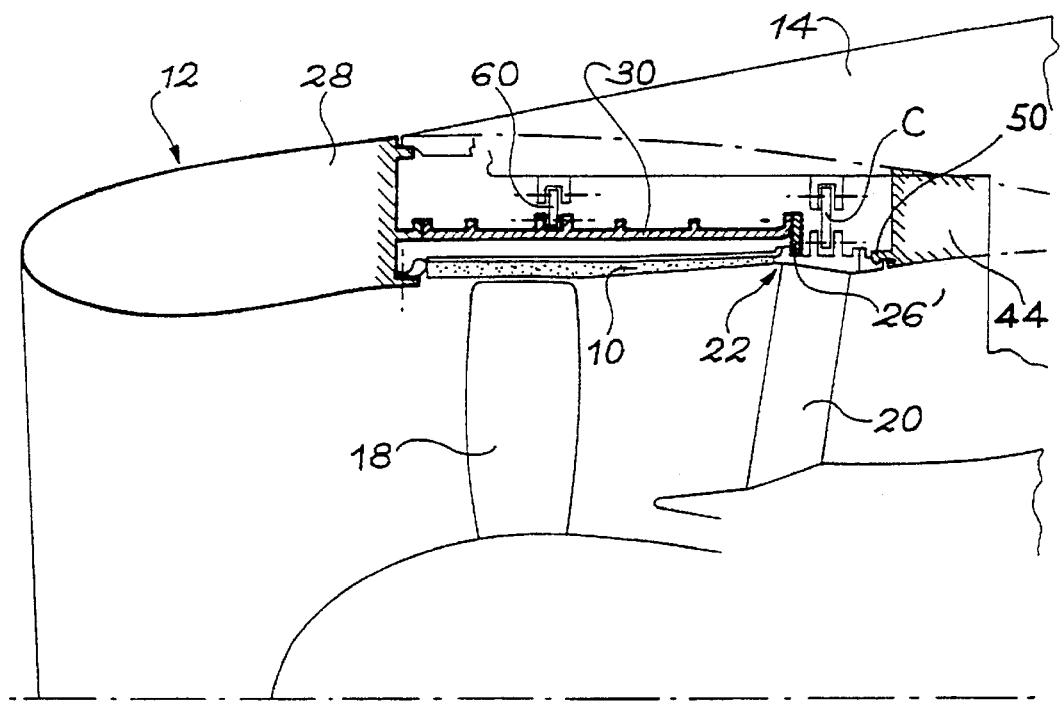
FIG. 10 A sectional view comparable to FIGS. 1 and 8 illustrating a third embodiment of the invention.

In a third embodiment of the invention illustrated in FIG. 10, applied to a pod with a general structure identical to that of the first embodiment, the centring means 22 are no longer formed by a system of rods, but by a continuous or segmented, circular ring 26' forming a flexible member in the radial plane YOZ, once again allowing a swivelling movement of the pod 12 about point 0 without any deformation of the fan stator case 10.

In this case, the direct connection between the pod 12 and the strut 14 can be obviated or limited to a stabilizer 60, e.g. formed by two or three links connecting the pod case 30 to the strut 14. These links can in particular be located between the circular ring 26' and the front box 28 of the pod, in a radial plane close the fan section 18.

The embodiment of FIG. 10 differs from those described hereinbefore by the fact that the means for attaching fixed parts of the engine to the strut 14 are no longer formed by the two sets of links A and B, but instead by the set of links B and a set of links C directly connecting the strut 14 to the rear portion of the fan envelope 10 on which are fixed the arms 20. More specifically, this set of links C is located immediately to the rear of the circular ring 26'.

Figure 11:
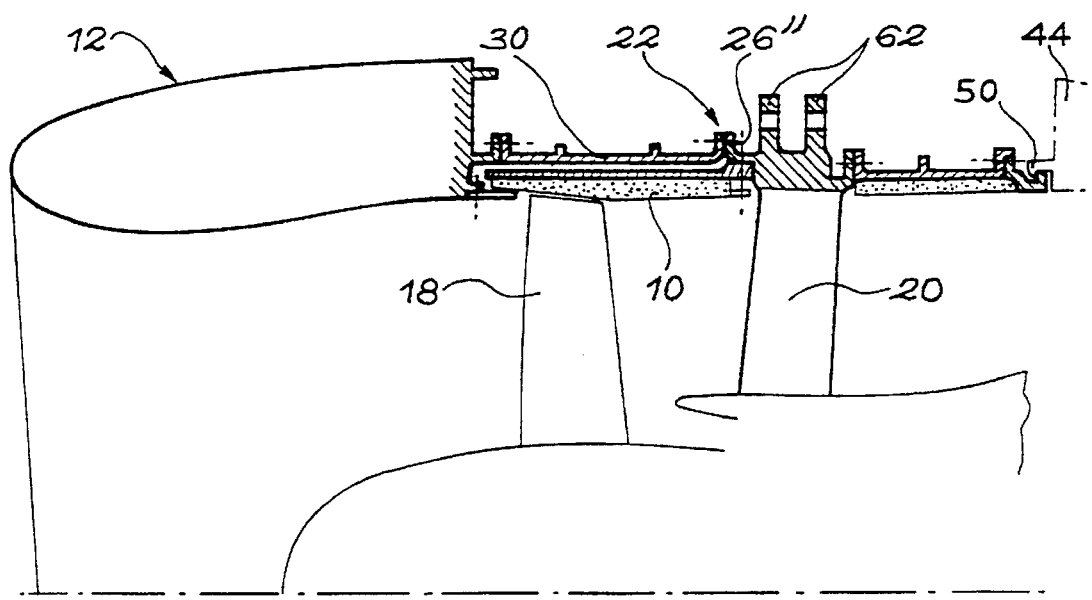
FIG. 11 A sectional view comparable to FIGS. 1, 8 and 10 illustrating a fourth embodiment of the invention.

FIG. 11 illustrates a fourth embodiment of the invention. To facilitate understanding, the strut and the outer covers of the pod 12 have been deliberately omitted.

As in the first and third embodiments, the embodiment of FIG. 11 relates to the case of a pod 12 having outer covers articulated to the strut about the pod case 30. However, it is also applicable, like the other embodiments, to the case where the outer covers 56 are replaced by a fixed, outer envelope 56' (FIGS. 8 and 9).

In this fourth embodiment of the invention, the centring means 22 connecting the rear end of the pod case 30 to the fan stator case 10 in the immediate vicinity of the arms 20 incorporate a flange 26", which is flexible in the plane YOZ, and formed directly in the case 10 in the immediate vicinity of the connection zone of the arms 20 to said case. The flange 26" is bolted to a complimentary flange formed on the rear end of the pod case 30, as illustrated in FIG. 11.

FIG. 11 also shows that the fan stator case 10 is equipped, above the arms 20 and slightly to the rear of the flange 26", with a clevis 62 making it possible to attach the engine to the strut with the aid of a link system comparable to system C in FIG. 10.

Obviously, the invention is not limited to the embodiments described hereinbefore and covers all technical equivalents thereof, as well as operative combinations thereof.

We claim:

1. Fan jet engine incorporating a rotary assembly, including a fan, and a fixed assembly, mounted on a strut for attaching the fan jet engine to a wing member, said fixed assembly including a central portion, a fan stator case surrounding the fan, at least one set of arms connecting the central portion to the fan stator case, and a pod surrounding the central portion and radially separated from the fan stator case by a gap, the pod cooperating with the fan stator case solely by centering means located in a plane in the vicinity of the arms and oriented radially with respect to a longitudinal axis of the central portion, which is characterized in that a rear portion of the pod has two covers directly articulated to the strut and incorporating a knife received in a groove formed on an intermediate portion of the pod, when the covers are closed, so that forces applied radially to the pod lead to a limited swivelling movement of said pod with respect to the fan stator case, about the intersection point of said plane with said longitudinal axis, and the forces not taken up by the centring means are transmitted directly to the strut without passing through the central portion.

2. Turbofan engine according to claim 1, wherein the centering means incorporate at least one substantially planar, flexible member oriented radially with respect to the longitudinal axis of the central portion and connecting the pod to the fan stator case.

3. Turbofan engine according to claim 2, wherein the flexible member is a continuous, circular ring.

4. Turbofan engine according to claim 2, wherein the flexible member is a segmented, circular ring.

5. Turbofan engine according to claim 2, wherein the flexible member comprises at least two rods oriented in accordance with a first mean direction substantially orthogonal to a median plane of the strut passing through the longitudinal axis of the central portion.

6. Turbofan engine according to claim 2, wherein the flexible member comprises a system of rods regularly distributed about the longitudinal axis of the central portion.

7. Turbofan engine according to claim 5, wherein each rod incorporates elastic means exerting a tensile stress along a longitudinal axis of said rod.

8. Turbofan engine according to claim 5, wherein each rod is fixed to the pod and to the fan stator case by ball joints.

9. Turbofan engine according to claim 1, wherein the centering means incorporate a flange formed directly on the fan stator case and fixed to the pod.

10. Turbofan engine according to claim 1, wherein the centering means incorporate pads fixed to one of the parts constituted by the pod and the fan stator case, said pads being in swivelling contact with the other part.

11. Turbofan engine according to claim 3, wherein stabilizing means able to mainly transmit forces exerted in a plane perpendicular to the longitudinal axis of the central portion connect the strut to the pod.

12. Turbofan engine according to claim 6, wherein two links placed in a plane orthogonal to a median plane of the strut and parallel to the longitudinal axis of the central portion and arranged symmetrically with respect to the median plane of the strut connect said strut to the pod.

13. Turbofan engine according to claim 12, wherein at least one third link forming an angle with said orthogonal plane and placed in the median plane of the strut also connects the strut to the pod.

14. Turbofan engine according to claim 12, wherein the links have a regulatable length.

15. Turbofan engine according to claim 5, wherein the fixing means directly connect the pod to the strut.

16. Turbofan engine according to claim 1, wherein the intermediate portion of the pod has outer covers articulated to the strut and a pod case in which is formed said groove and whereof a rear end cooperates with the fan stator case by the centering means.

17. Turbofan engine according to claim 1, wherein a front portion of the pod forms a box in which is formed said groove and whereof a rear end cooperates with the fan stator case by the centering means.

* * * * *